April 9, 1963

T. P. FLEER ET AL 3,084,865

GAS BURNER CONTROL DEVICE

Filed Nov. 25, 1960

INVENTORS
THOMAS P. FLEER
JOSEPH V. WOODLEY, JR.
BY
*Charles E. Markham*
THEIR AGENT April 9, 1963 T. P. FLEER ET AL 3,084,865
GAS BURNER CONTROL DEVICE
Filed Nov. 25, 1960 2 Sheets-Sheet 2
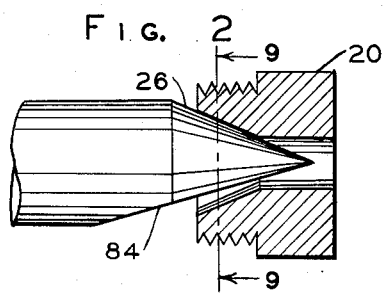
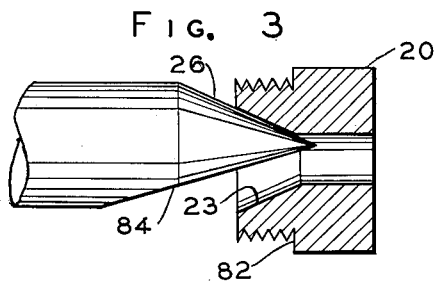
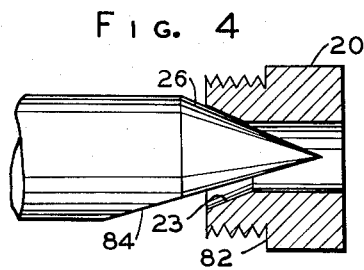
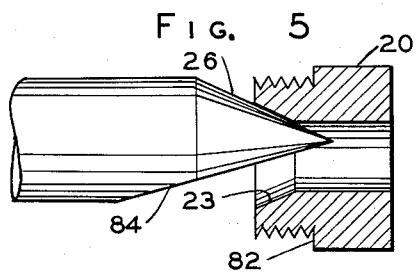
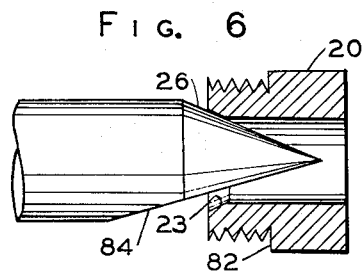
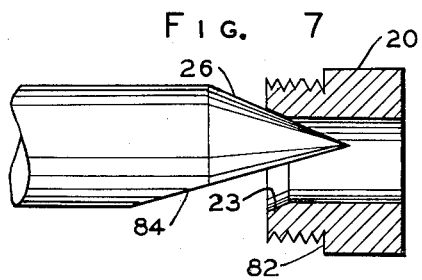
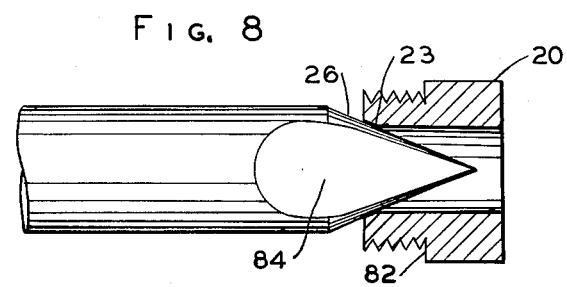
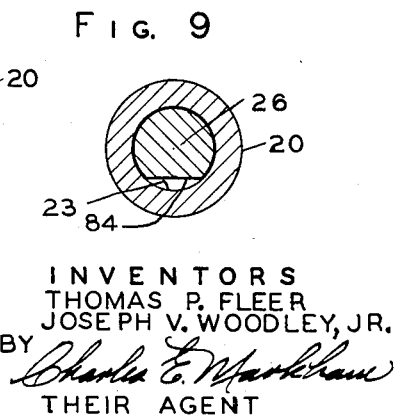
INVENTORS
THOMAS P. FLEER
JOSEPH V. WOODLEY, JR.
BY
THEIR AGENT

United States Patent Office 3,084,865
Patented Apr. 9, 1963

3,084,865
GAS BURNER CONTROL DEVICE
Thomas P. Fleer, Affton, and Joseph V. Woodley, Jr., Kirkwood, Mo., assignors, by mesne assignments, to White-Rodgers Company, a corporation of Missouri
Filed Nov. 25, 1960, Ser. No. 71,541
4 Claims. (Cl. 236—99)

This invention relates to fuel flow control devices for gas burners and particularly to means for varying the flow of fuel to the burner in accordance with the temperature of the space being heated by the burner.

An object of this invention is to provide a fuel flow control device which varies the flow of fuel to the burner linearly with space temperature change between predetermined maximum and minimum flow rates and which further maintain equivalent flow to the burner in terms of calorific value when fuels of different heat value are used with no other change or adjustment than a change in diameter of the fuel metering orifice.

A further object is to provide a fuel flow control device comprising an orifice plug having an orifice therein and a tapered approach bore leading thereto and an axially movable metering pin with a conical point of the same taper as said approach bore adapted to seat on the tapered approach bore whereby the axial inward movement of the metering pin is stopped at precisely the same point irrespective of the diameter of the orifice.

A further object is to provide a fuel flow control device of the above character in which the conically pointed end of the metering pin is provided with a cutaway portion which extends longitudinally at such an angle to the axis of the pin as to effect a substantially linear variation in flow through the orifice as the metering pin is moved axially therein and provides a predetermined minimum flow when the conical end is seated on the tapered approach bore.

A further object is to provide a fuel metering device of the above character which includes a temperature responsive actuator for moving the metering pin axially in said orifice in linear relationship to variations in the temperature to which it is sensitive and which further includes stop means arranged to arrest the outward movement of said metering pin so as to limit the range of axial movement of the pin to that in which it maintains substantially linear flow modulation.

These and other objects and advantages which become apparent upon reading the following description in connection with the accompanying drawings are the purposes of the present invention.

In the drawings:

FIG. 2 shows an orifice plug with the metering pin seated on the tapered approach bore;

FIG. 3 shows the same orifice plug with the metering pin shown in its furthest withdrawn position;

FIG. 4 shows the metering pin seated on the tapered approach bore of an orifice plug having a larger diameter orifice;

FIG. 5 shows the metering pin in its furthest withdrawn position in the larger orifice shown in FIG. 4;

FIG. 6 shows the metering pin seated on the tapered approach bore of an orifice plug having a still larger diameter bore;

FIG. 7 shows the metering pin in its furthest withdrawn position from the orifice plug shown in FIG. 6;

FIG. 8 is a view showing the metering pin rotated 90° from the position shown in FIG. 6; and FIG. 9 is a sectional view taken along line 9—9 of FIG. 2.

Figure 1:
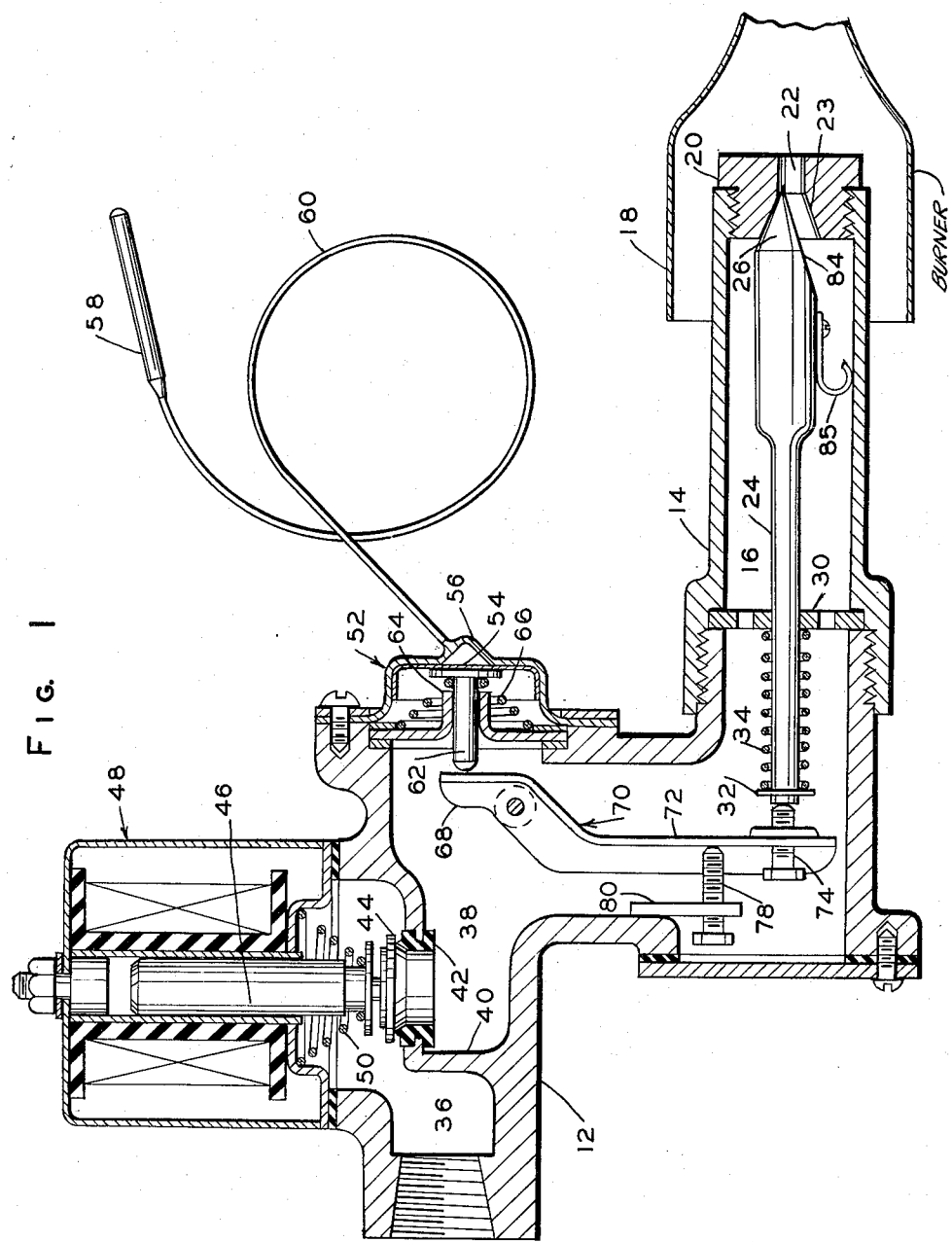
FIG. 1 is a longitudinal cross-sectional view of a flow control device constructed in accordance with the present invention.

The burner control device shown in FIG. 1 includes a valve body 12 having an extension tube 14 attached thereto which provides an outlet passageway 16 extending into the inlet end of a burner shown fragmentarily at 18. One end of the tube 14 is threadedly connected to valve body 12 and the other end, which extends into the inlet of burner 18, is internally threaded and receives a shouldered orifice plug 20 which is threadedly engaged therein. Orifice plug 20 is provided with a cylindrical orifice bore 22 and a tapered counterbore 23 forming an approach thereto. An axially movable metering pin 24 having an enlarged, conically pointed end portion 26 extends into the cylindrical orifice bore 22 from its flared end and variably restricts the bore as it is moved axially relative thereto. The base diameter of the conically pointed end 26 is larger than the diameter of the cylindrical orifice bore 22, and the included angle of the conically pointed end portion 26 is the same as the included angle of the tapered approach 23 so that the tapered surface of the conical point and the wall of the tapered counterbore 23 engage in seating relationship as the metering pin is moved toward the orifice. This arrangement insures that the inward travel of the metering pin is stopped at precisely the same point irrespective of variations in the diameter of the cylindrical orifice bore and has the further advantage of substantial contact area which precludes peaning of the orifice edge which would otherwise occur in the absence of the tapered counterbore. The conically tapered end of pin 24 is provided with a longitudinally extending flat surface 84 which permits a predetermined minimum flow when the tapered end of pin 24 is seated and additionally provides for varying the flow proportional to the axial movement of pin 24 as more fully described hereinafter. The small diameter portion of the metering pin 24 is loosely guided in alignment with the orifice bore 22 by an apertured guide plate 30 so that the tapered end of the metering pin is slidably guided by the flared portion of the orifice bore 20. The metering pin 24 is biased in a direction to withdraw the conical point from the orifice by a compression spring 34 which bears at one end against the guide plate 30 and at its other end against a C-washer 32 positioned near the small diameter end of the pin.

The valve body 12 has an inlet passageway 36 and a connecting passageway 38 leading to the outlet passageway 16 formed by the extension tube 14. The inlet passage is separated from the connecting passageway by a partition 40 which is provided with a port therethrough. The port is fitted with an annular valve seat 42 which in cooperation with a reciprocating valve 44 controls the flow from inlet passageway 36 to connecting passageway 38 and outlet passage 16. The valve 44 is normally biased against seat 42 by a spring 50. Valve 44 is attached to a reciprocating plunger 46 of a solenoid 48 which when energized lifts valve 44 from its seat 42 permitting communication between the passageways 36 and 38. Solenoid 48 may be energized by any suitable power source controlled by an auxiliary switch which may be manually or automatically operable.

Mounted on a wall of connecting passageway 38 is a temperature responsive actuator 52 including an expansible chamber defined by a flexible wall 54 and a rigid wall 56. A bulb 58, mounted so as to be sensitive to the controlling temperature, communicates with the expansible chamber by means of a length of capillary tubing 60. The bulb, tubing, and expansible chamber are filled with a suitable thermally-expanding fluid such as xylene. A lever 70 having a short arm 68 and a long arm 72 is pivotally mounted intermediate of its ends in passageway 38. The short arm 68 is arranged to contact one end of a push rod 62, which is slidably supported in a support member 64. The other end of push rod 62 bears against the flexible wall 54 of the temperature responsive actuator 52 and is biased against wall 54 by a compression spring 66. The long arm 72 carries at its free end a threadedly adjustable contact member 74 which engages the small diameter end of metering pin 24. A stop member 78 threadedly adjustable in a rigid support member 80 is engaged by the long arm 72 and limits the clockwise rotation of the lever 70. The arrangement is such that the clockwise rotation of lever 70 is limited by the stop member 78 to movement within that range wherein the biasing spring 34 acting on metering pin 24 maintains contact between the contact member 74 and the collared end of the metering pin. The lever 70 thereby continually controls the position of the metering pin 24.

Provision is made in this device whereby it is adapted by the mere substitution of orifice plugs to dispense fuels of different heating values at the correspondingly required rates to produce equivalent burner heat output. Three orifice plugs are generally provided, one for each of the three commonly used gaseous fuels, namely; natural gas manufactured gas, and liquid petroleum gas. All of the plugs are identical except for the diameters of their cylindrical orifice bores. Each of the plugs has a shoulder 82 and identically tapered counterbores 23, the apices of the projected sides of which are in the same axial spaced relationship with their respective shoulders 82. The shoulder 82 accurately positions the counterbore 23 of a plug when threadedly engaged in the extension tube 14 so that its tapered counterbore will have precisely the same axially spaced relationship with the metering pin 24 as the counterbore of any of the other plugs when so engaged. Thus, the inward limit of travel of metering pin 24 will be precisely the same irrespective of the plug used.

Linear modulation of the gas flow relative to the controlling temperature is a desirous feature of this invention. Applicant has accomplished this by employing a temperature responsive actuator 52, which is linearly responsive to the controlling temperature over the range that modulation occurs, and by the provision of flat surface 84 on the operative portion of the metering pin 24. Since the metering pin 24 moves axially in a proportional relationship to the movement of actuator 52, a plain conically pointed pin moving axially in an orifice bore would result in varying the fuel flow generally as the square of the controlling temperature, but it has been found that by providing the flat surface 84 which extends longitudinally from the point of the metering pin 24 and which diverges inwardly with respect to the axis of the pin 24 at the required angle, we are able to effect a flow variation through the orifice which is substantially linear. Although a flat surface was chosen in this particular form of the invention, it is readily apparent that there are other relief surfaces which can be formed so as to produce an equivalent result and these are to be considered to be equivalent to the flat surface. Additionally provided on the metering pin 24 is a flat leaf spring 85 rigidly attached to that side of the metering pin having the flat surface 84. Spring 85 bears against the inner wall of tube 14 and biases the metering pin 24 transversely to insure that the arcuate portion of its tapered end opposite the flat surface thereon will be constantly engaged with the wall of the flared portion 23 of the orifice plug 20, thus preventing vibration of the metering pin which would otherwise cause a fluctuation of the fuel flow rate.

*In Operation*

Assume the space to be heated is below the temperature where modulation of the fuel flow is desired. Under this condition the metering pin 24 is in its maximum withdrawn position. Upon energization of solenoid 48 the maximum rate of fuel flows to the burner where it is ignited by suitable means causing the temperature of the space to rise quickly. As the space temperature rises the volume of the thermally expanding fluid in the temperature responsive actuator 52 increases. At a first predetermined temperature the volume of the fluid is such that any additional increase in volume causes lever 70 to rotate in a counterclockwise direction to move the metering pin 24 inwardly with respect to the orifice, thereby further restricting the cylindrical portion 22 of the orifice bore. The temperature responsive actuator is so constructed as to impart movement to the lever 70 and metering pin 24 which is proportional to temperature change over the temperature range that modulation is desired. The angle of the flat surface 84 on the metering pin 24 is such as to effect a variation in fuel flow rate through the orifice which is linearly related to axial movement of the metering pin 24 and, therefore, space temperature change. As the space temperature attains a second, higher, predetermined temperature, the tapered surface 26 of the metering pin 24 engages the tapered approach bore 22 in seating relationship. When the pin is seated only a predetermined minimum fuel flow rate, through that discharge area remaining between the flat surface on the pin and the cylindrical orifice bore, is permitted. The second, higher, predetermined temperature at which seating of the pin 24 occurs is preset at assembly by adjustment of contact member 74.

When operation of the burner is cut off by the closing of valve 44, the space temperature drops and the liquid temperature responsive actuator 52 contracts and permits the metering pin 24 to be moved outwardly with respect to the orifice by the biasing spring 34. When the space temperature has decreased to the first predetermined temperature, the metering pin 24 is stopped from further outward movement by the stop member 78, the position of which is also preset at assembly; thus, the inward and outward limits of travel of the metering pin 24 are definitely fixed. The temperature responsive device 52 may, however, continue to respond to further decreasing temperature without effecting further movement of the metering pin. The preset position of stop member 78 is such that the outward movement of the metering pin 24 is stopped before the point of the pin is withdrawn from the cylindrical portion 22 of the orifice so that the metering pin is effective in providing linear modulation over the entire range of its movement.

Applicants contemplate furnishing with the fuel control device a plurality of orifice plugs having selected orifice diameters for interchange with the threadedly engaged orifice plug 20 so that a fixed flow of fuel in terms of calorific value may be maintained under conditions wherein the calorific value of the fuel supply is varied. It will be seen from the foregoing description that the interchange of orifice plugs, which are identical except for the diameter of the cylindrical portion of the orifice bore, does not in any way disturb the preadjusted travel of the metering pin 24. This is a salient feature of the present invention which renders the control device universally adaptable to use with different gaseous fuels by the simple interchange of orifice plugs.

The foregoing description is intended to be illustrative of the principles of the invention and not limiting, the scope of the invention being set forth in the appended claims.

We claim:

1. In a temperature modulated gas burner adapted to be operated at equivalent heat output rates at predetermined temperatures with fuels of different calorific value by the mere interchange of orifice members; means forming a fuel conduit leading and discharging into the burner inlet, a metering orifice threadedly engaged in fixed position in the end of said conduit, said orifice member having a cylindrical orifice bore therethrough and being flared at its upstream end to form a tapered approach thereto, a slidably mounted metering pin having a conically pointed end arranged to enter said cylindrical orifice bore at its flared end, said metering pin being of larger diameter than said cylindrical orifice bore and its conically pointed end being of substantially the same angle of taper as said flared end of said orifice bore, whereby said conical end of said metering pin seats in said flared orifice approach as it is moved inward and is thereby stopped at a predetermined point with respect to said orifice member and said conduit irrespective of the diameter of said cylindrical orifice bore, said metering pin being further provided with at least one axially extending depression of the arcuate surface of its conical end extending inwardly from the point to at least the base of its conical end to provide a predetermined minimum flow when said metering pin is seated and to vary the flow in predetermined relationship with axial movement of said pin, a temperature responsive device mounted in fixed relationship with said conduit and said orifice member and being operatively connected to said metering pin, and stop means limiting the axial movement of said metering pin to a range wherein said pin remains entered into the cylindrical portion of said orifice bore.

2. In a gas burner as set forth in claim 1 in which abutting surfaces are provided on said metering orifice member and said fuel conduit to insure a precise fixed relationship of these elements.

3. In a gas burner as set forth in claim 1 in which the axially extending depression of the arcuate surface of the conical end of said metering pin consists of at least one flat surface which extends inwardly from the apex of said conical end to at least the base of said conical end of said pin and which diverges inwardly at such angle with respect to the axis of said pin as to result in a linear relationship between flow through said orifice member and axial movement of said metering pin.

4. In a gas burner as set forth in claim 1 in which said temperature responsive device is capable of imparting axial movement to said metering pin in linear relationship with temperature change at least through that range of travel of said pin in which it is entered into said cylindrical portion of said orifice bore.

References Cited in the file of this patent

UNITED STATES PATENTS

| | | |
|---|---|---|
| 1,733,888 | Landgraf | Oct. 29, 1929 |
| 2,338,810 | Guthrie | Jan. 11, 1944 |
| 2,505,975 | Landon | May 2, 1950 |
| 2,736,501 | Widell | Feb. 28, 1956 |
| 2,822,789 | Philips et al. | Feb. 11, 1958 |
| 2,884,009 | Hetherington | Apr. 28, 1959 |
| 2,936,789 | Krein | May 17, 1960 |